UNITED STATES PATENT OFFICE 2,250,107

CONCRETE

John S. Nelles, Detroit, Mich., assignor to The Detroit Edison Company, Detroit, Mich., a corporation of New York No Drawing. Application September 2, 1939, Serial No. 293,303

11 Claims. (Cl. 106—97)

This invention relates to concretes and more particularly to Portland cement concretes designed and intended for use in the erection of reinforced concrete structures.

Concretes suitable for such use comprise mixtures of cement, fine aggregate and coarse aggregate (see A. S. T. M. Designation: C33–37T) and, at the time of mixing and placing in forms, those quantities of water which are deemed necessary to obtain desired consistencies when wet and compressive strengths when dry.

The coarse aggregate employed may be pebbles, crushed rock of various types, and products of various types of combustion such as slag and cinders. The function of the coarse aggregate in the concrete is to lend bulk and strength at an expense less than that of the cement and fine aggregates, and also to reduce the overall shrinkage induced by the shrinkage of the cement upon setting.

The function of the fine aggregate, generally speaking, is to form, with the cement and water, a mortar or matrix which will support the coarse aggregate in suspension after the mixing operation. It will be understood that, immediately after the concrete has been poured, the denser particles of the coarse aggregate tend to settle towards the bottom of the matrix and it frequently happens that the lighter bonding matrix fails to follow the coarse particles downwardly. This results in an undue concentration of the aggregate near the bottom of the forms in which the concrete has been poured and likewise often causes the bonding matrix to fail to make adequate bond with all surfaces of the coarse aggregate particles so that the actual strength of the concrete mixture is less than the designed strength. It is important therefore to have a matrix of a sufficient fluidity to facilitate pouring but which also is sufficiently viscous so that the segregation of the coarse aggregate is prevented and a satisfactory bond is made with all sides of the particles of the coarse aggregate.

Sand has been the material most commonly used as a fine aggregate. It is available at low cost in most localities, generally it is of the specified size, and is of sufficient strength. Sand may be defined as natural or artificial chemically inert inorganic materials having sizes falling within the graded size classification set forth in A. S. T. M. Designation C33–37T. This specifies that all of the particles of the fine aggregate shall be small enough to pass through a 3/8" mesh screen and shall have sizes uniformly ranging downwardly to a size which is retained on a 100 mesh sieve, with not more than 8% passing the sieve of such mesh. Limestone, volcanic silicious materials, and granite low in mica are examples of materials which have been used as fine aggregates, inasmuch as these materials will fulfill the above graded size specifications.

I have discovered that a material, heretofore never made use of as a fine aggregate for concrete, or suggested as useful for that purpose, has properties which render it especially valuable as a fine aggregate.

It may be used with all kinds of coarse aggregates and has been found to be especially suitable for use with cinders.

This material, called fly ash, is the ash produced when pulverized coals, usually bituminous in nature, are burned in suspension. It is usually collected from the exhaust gases by electrical precipitation.

Fly ash has varying chemical characteristics depending upon the coals from which it is obtained. An approximate analysis is as follows:

| | Per cent |
|---|---|
| Lime (CaO) | 2 |
| Silica ($SiO_2$) | 43 |
| Alumina ($Al_2O_3$) | 25 |
| Iron oxide ($Fe_2O_3$) | 15 |
| Magnesia (MgO) | 1 |
| Sulphur trioxide ($SO_3$) | 1 |
| Carbon (C) | 1 to 12 |
| $R_2O$ | 1 |

It will be noted that the calcium oxide content is only approximately 1/30 of that present in a good Portland cement and that the silica and alumina contents are considerably higher.

The fly ash which I have employed with great success comprises very finely divided particles, 89.3% of which will pass through a 200 mesh screen, and 75% will pass through a 400 mesh screen. It is thus much finer by far than are the sands and other fine aggregates which have been specified for standard structural concretes. Fly ash has an apparent specific gravity of 2.26 and a dry rodded unit weight of about 53 pounds per cubic foot.

Fly ash as a fine aggregate in concrete may be used in combination with sand, but in all cases where it is used, it should be considered a substitute for all or part of the sand or other fine aggregate which would otherwise have to be used.

The resulting concrete is, while wet, more easily worked than a sand concrete and, when dry, lighter, stronger, more uniform and more elastic than a concrete of the same approximate composition containing sand as the sole fine aggregate.

The proportion of fly ash used in any batch of concrete may be conveniently expressed as the ratio of the amount of fly ash used to the amount of cement used. In accordance with my invention, the ratio of fly ash to cement may vary between 1 and 5.4 or more, the amounts of cement and fly ash being measured in cubic feet. Preferably this ratio varies between 1½ and 2½ times the amount of cement. I have discovered that the amount of water which is used in a cement-fly ash-coarse aggregate concrete is greater than the amount used in mixing an equal amount of cement-sand-coarse aggregate concrete of the same strength, and that the fly ash has the ability to take up more water than does the sand.

In every case, however, the mixture may be given the consistency desired by adding the proper quantity of water.

In concretes having fly ash as fine aggregate added workability results from the use of increased amounts of water, without, however, lowering the compressive strength. This is highly advantageous in pouring concretes into molds and forms inasmuch as it is necessary that the material shall fill every crevice before the initial set of the cement occurs.

Furthermore, concretes having fly ash as a fine aggregate are lighter in weight than concretes with sand as the fine aggregate. For example, a standard pebble concrete weighs about 150 pounds per cubic foot, whereas the series of fly ash-pebble concretes weighed 140 pounds per cubic foot, and the series of fly ash-cinder concretes produced weights as low as only 95.5 pounds per cubic foot.

In general, fly ash concretes have a finer texture and are, therefore, more pleasing to the eye. They may be mixed quite readily and are usually lower in cost than sand concretes inasmuch as fly ash is essentially a waste product.

For example, in one case it was found that fly ash concrete could be mixed for about ten per cent less than a standard sand-pebble concrete of the same strength.

In charging the mixer when fly ash is used, the order of charging is important in order to minimize lumping of the ash and to reduce the time necessary for mixing. The preferred order is: water, fly ash, cement, other fine aggregate (when used), and coarse aggregate. After charging the several ingredients into a suitable mixer the mixer is revolved in the usual manner. Preferably, however, it is revolved through a greater number of revolutions than thought necessary in the mixing of ordinary concretes, for instance from fifty to a hundred or more revolutions. In mixing fly ash concretes in which cinders are the coarse aggregate, I have found that fly ash is extremely beneficial because its specific gravity more nearly approaches that of the cinders. This results in an intimate mixture of fly ash and cinders, with the fly ash particles serving to fill or plug any of the apertures in the surface of the larger cinder particles. Heretofore these apertures have been plugged by the cement alone, inasmuch as it is the only ingredient of the concrete which is fine enough to serve this purpose. With fly ash in the concrete, its particles, which are as fine as those of the cement, tend to take over this plugging function leaving additional cement available for extra strength.

As examples of my improved concrete the following are illustrative:

Pebbles as Coarse Aggregate

*Proportions, by volume, of concrete ingredients*

| Cement | Fly ash | Sand | Pebbles |
|---|---|---|---|
| 1 | 1.75 | 1.5 | 3.6 |

| Water-cement ratio | Cu. ft. cement per yd. | Cu. ft. fly ash per yd. | 28-day compressive strength per sq. in. |
|---|---|---|---|
| 1.27 | 4.67 | 8.17 | 3590 |
| 1.33 | 4.61 | 8.07 | 2930 |
| 1.40 | 4.56 | 8.00 | 2820 |

*Proportions, by volume, of concrete ingredients*

| Cement | Fly ash | Sand | Pebbles |
|---|---|---|---|
| 1 | 1.75 | 1 | 3.5 |

| Water-cement ratio | Cu. ft. cement per yd. | Cu. ft. fly ash per yd. | 28-day compressive strength per sq. in. |
|---|---|---|---|
| 1.27 | 4.98 | 8.72 | 3620 |
| 1.33 | 4.92 | 8.61 | 3480 |
| 1.47 | 4.82 | 8.43 | 2580 |

*Proportions, by volume, of concrete ingredients*

| Cement | Fly ash | Sand | Pebbles |
|---|---|---|---|
| 1 | 1.75 | 1 | 3.0 |

| Water-cement ratio | Cu. ft. cement per yd. | Cu. ft. fly ash per yd. | 28-day compressive strength per sq. in. |
|---|---|---|---|
| 1.27 | 5.33 | 9.33 | 3847 |
| 1.33 | 5.25 | 9.19 | 3400 |
| 1.4 | 5.19 | 9.08 | 2940 |

*Proportions, by volume, of concrete ingredients*

| Cement | Fly ash | Sand | Pebbles |
|---|---|---|---|
| 1 | 1.5 | 1 | 3 |

| Water-cement ratio | Cu. ft. cement per yd. | Cu. ft. fly ash per yd. | 28-day compressive strength per sq. in. |
|---|---|---|---|
| 1.13 | 5.54 | 8.31 | 3870 |
| 1.2 | 5.48 | 8.22 | 3760 |
| 1.27 | 5.42 | 8.13 | 3520 |

*Proportions, by volume, of concrete ingredients*

| Cement | Fly ash | Sand | Pebbles |
|---|---|---|---|
| 1 | 1 | 1 | 3 |

| Water-cement ratio | Cu. ft. cement per yd. | Cu. ft. fly ash per yd. | 28-day compressive strength per sq. in. |
|---|---|---|---|
| 1.07 | 5.87 | 5.87 | 3893 |
| 1.13 | 5.78 | 5.78 | 3630 |
| 1.2 | 5.7 | 5.7 | 2800 |

*Proportions, by volume, of concrete ingredients*

| Cement | Fly ash | Sand | Pebbles |
|---|---|---|---|
| 1 | 2 | 1 | 3.5 |

| Water-cement ratio | Cu. ft. cement per yd. | Cu. ft. fly ash per yd. | 28-day compressive strength per sq. in. |
|---|---|---|---|
| 1.33 | 4.86 | 9.72 | 3470 |
| 1.4 | 4.81 | 9.62 | 2940 |
| 1.47 | 4.75 | 9.5 | 2820 |

*Proportions, by volume, of concrete ingredients*

| Cement | Fly ash | Sand | Pebbles |
|---|---|---|---|
| 1 | 2.5 | .5 | 3.5 |

| Water-cement ratio | Cu. ft. cement per yd. | Cu. ft. fly ash per yd. | 28-day compressive strength per sq. in. |
|---|---|---|---|
| 1.53 | 4.80 | 12.00 | 2953 |
| 1.6 | 4.75 | 11.88 | 2883 |
| 1.73 | 4.64 | 11.60 | 2310 |

*Proportions, by volume, of concrete ingredients*

| Cement | Fly ash | Sand | Pebbles |
|---|---|---|---|
| 1 | 3 | 0 | 3 |

| Water-cement ratio | Cu. ft. cement per yd. | Cu. ft. fly ash per yd. | 28-day compressive strength per sq. in. |
|---|---|---|---|
| 1.87 | 4.92 | 14.76 | 2400 |

*Proportions, by volume, of concrete ingredients*

| Cement | Fly ash | Sand | Pebbles |
|---|---|---|---|
| 1 | 2.5 | .86 | 4.93 |

| Water-cement ratio | Cu. ft. cement per yd. | Cu. ft. fly ash per yd. | 28-day compressive strength per sq. in. |
|---|---|---|---|
| 1.6 | 4.0 | 10.0 | 2795 |

*Proportions, by volume, of concrete ingredients*

| Cement | Fly ash | Sand | Pebbles |
|---|---|---|---|
| 1 | 2 | .94 | 5.35 |

| Water-cement ratio | Cu. ft. cement per yd. | Cu. ft. fly ash per yd. | 28-day compressive strength per sq. in. |
|---|---|---|---|
| 1.47 | 4.0 | 8.0 | 3000 |

*Proportions, by volume, of concrete ingredients*

| Cement | Fly ash | Sand | Pebbles |
|---|---|---|---|
| 1 | 2.25 | .90 | 5.14 |

| Water-cement ratio | Cu. ft. cement per yd. | Cu. ft. fly ash per yd. | 28-day compressive strength per sq. in. | 90-day compressive strength per sq. in. |
|---|---|---|---|---|
| 1.53 | 4.0 | 9.0 | 3280 | 4720 |

With these high ash contents, the greatest advantage in strength appears as the concrete ages. It will be observed that, in the above example for instance, there was a 43% increase in strength between the high ash concrete after ninety days as compared with its strength after twenty-eight days.

*Proportions, by volume, of concrete ingredients*

| Cement | Fly ash | Sand | Pebbles |
|---|---|---|---|
| 1 | 2.8 | 0 | 3 |

| Water-cement ratio | Cu. ft. cement per yd. | Cu. ft. fly ash per yd. | 28-day compressive strength per sq. in. |
|---|---|---|---|
| 1.73 | 5.13 | 14.36 | 2524 |

*Proportions, by volume, of concrete ingredients*

| Cement | Fly ash | Sand | Pebbles |
|---|---|---|---|
| 1 | 2 | .44 | 3.96 |

| Water-cement ratio | Cu. ft. cement per yd. | Cu. ft. fly ash per yd. | 28-day compressive strength per sq. in. |
|---|---|---|---|
| 1.23 | 5.14 | 10 | 2920 |

CINDERS AS COARSE AGGREGATE

*Proportions, by volume, of concrete ingredients*

| Cement | Fly ash | Sand | Cinders |
|---|---|---|---|
| 1 | 2.5 | 0 | 5.82 |

| Water-cement ratio | Cu. ft. cement per yd. | Cu. ft. fly ash per yd. | 28-day compressive strength per sq. in. |
|---|---|---|---|
| 1.95 | 4.03 | 10.1 | 2380 |

By way of contrast with these proportions, note the following example:

Proportions, by volume, of concrete ingredients

| Cement | Fly ash | Sand | Cinders |
|---|---|---|---|
| 1 | 0 | 2.5 | 5.82 |

| Water-cement ratio | Cu. ft. cement per yd. | Cu. ft. fly ash per yd. | 28-day compressive strength per sq. in. |
|---|---|---|---|
| 1.12 | 4.03 | 0 | 1800 |

Proportions, by volume, of concrete ingredients

| Cement | Fly ash | Sand | Cinders |
|---|---|---|---|
| 1 | 2.5 | .29 | 5.48 |

| Water-cement ratio | Cu. ft. cement per yd. | Cu. ft. fly ash per yd. | 28-day compressive strength per sq. in. |
|---|---|---|---|
| 1.89 | 4.03 | 10.1 | 2370 |

Proportions, by volume, of concrete ingredients

| Cement | Fly ash | Sand | Cinders |
|---|---|---|---|
| 1 | 2 | 0 | 4.5 |

| Water-cement ratio | Cu. ft. cement per yd. | Cu. ft. fly ash per yd. | 28-day compressive strength per sq. in. |
|---|---|---|---|
| 1.58 | 5 | 10 | 2990 |

Proportions, by volume, of concrete ingredients

| Cement | Fly ash | Sand | Cinders |
|---|---|---|---|
| 1 | 2 | .23 | 4.28 |

| Water-cement ratio | Cu. ft. cement per yd. | Cu. ft. fly ash per yd. | 28-day compressive strength per sq. in. |
|---|---|---|---|
| 1.55 | 5 | 10 | 3120 |

Proportions, by volume, of concrete ingredients

| Cement | Fly ash | Sand | Cinders |
|---|---|---|---|
| 1 | 1 | .585 | 1.75 |

| Water-cement ratio | Cu. ft. cement per yd. | Cu. ft. fly ash per yd. | 28-day compressive strength per sq. in. |
|---|---|---|---|
| 1.07 | 8.95 | 8.95 | 4580 |
| 1.1 | 8.84 | 8.84 | 4223 |
| 1.13 | 8.73 | 8.73 | 4149 |

These high cement content examples demonstrate that the principle governing the use of fly ash as a fine aggregate, applies to extremely rich mixtures as well as to leaner mixtures.

Proportions, by volume, of concrete ingredients

| Cement | Fly ash | Sand | Cinders |
|---|---|---|---|
| 1 | 1.25 | .585 | 1.75 |

| Water-cement ratio | Cu. ft. cement per yd. | Cu. ft. fly ash per yd. | 28-day compressive strength per sq. in. |
|---|---|---|---|
| 1.13 | 8.5 | 10.6 | 3930 |
| 1.2 | 8.3 | 10.4 | 3887 |
| 1.27 | 8.14 | 10.2 | 3571 |

Proportions, by volume, of concrete ingredients

| Cement | Fly ash | Sand | Cinders |
|---|---|---|---|
| 1 | 1.63 | 1.17 | 3.5 |

| Water-cement ratio | Cu. ft. cement per yd. | Cu. ft. fly ash per yd. | 28-day compressive strength per sq. in. |
|---|---|---|---|
| 1.6 | 5.52 | 9.0 | 2877 |
| 1.73 | 5.38 | 8.77 | 2679 |

Proportions, by volume, of concrete ingredients

| Cement | Fly ash | Sand | Cinders |
|---|---|---|---|
| 1 | 1.63 | 1 | 3 |

| Water-cement ratio | Cu. ft. cement per yd. | Cu. ft. fly ash per yd. | 28-day compressive strength per sq. in. |
|---|---|---|---|
| 1.47 | 6.08 | 9.91 | 3110 |
| 1.6 | 5.9 | 9.62 | 2686 |

Proportions, by volume, of concrete ingredients

| Cement | Fly ash | Sand | Cinders |
|---|---|---|---|
| 1 | 2 | .75 | 3 |

| Water-cement ratio | Cu. ft. cement per yd. | Cu. ft. fly ash per yd. | 28-day compressive strength per sq. in. |
|---|---|---|---|
| 1.67 | 5.79 | 11.58 | 3049 |
| 1.73 | 5.7 | 11.4 | 2920 |
| 1.80 | 5.63 | 11.26 | 2778 |

Proportions, by volume, of concrete ingredients

| Cement | Fly ash | Sand | Cinders |
|---|---|---|---|
| 1 | 2 | 1.33 | 4 |

| Water-cement ratio | Cu. ft. cement per yd. | Cu. ft. fly ash per yd. | 28-day compressive strength per sq. in. |
|---|---|---|---|
| 1.67 | 4.7 | 9.4 | 2970 |
| 1.87 | 4.55 | 9.1 | 2260 |

LIMESTONE AS COARSE AGGREGATE

Proportions, by volume, of concrete ingredients

| Cement | Fly ash | Sand | Limestone |
|---|---|---|---|
| 1 | 1.25 | 1.5 | 2.5 |

| Water-cement ratio | Cu. ft. cement per yd. | Cu. ft. fly ash per yd. | 28-day compressive strength per sq. in. |
|---|---|---|---|
| 1.2 | 5.77 | 7.21 | 3900 |

Proportions, by volume, of concrete ingredients

| Cement | Fly ash | Sand | Limestone |
|---|---|---|---|
| 1 | 1.75 | 1 | 2.5 |

| Water-cement ratio | Cu. ft. cement per yd. | Cu. ft. fly ash per yd. | 28-day compressive strength per sq. in. |
|---|---|---|---|
| 1.47 | 5.63 | 9.85 | 3196 |

Proportions, by volume, of concrete ingredients

| Cement | Fly ash | Sand | Limestone |
|---|---|---|---|
| 1 | 2.00 | 1 | 2.5 |

| Water-cement ratio | Cu. ft. cement per yd. | Cu. ft. fly ash per yd. | 28-day compressive strength per sq. in. |
|---|---|---|---|
| 1.6 | 5.38 | 10.76 | 3116 |

Proportions, by volume, of concrete ingredients

| Cement | Fly ash | Sand | Limestone |
|---|---|---|---|
| 1 | 2.5 | .5 | 2.5 |

| Water-cement ratio | Cu. ft. cement per yd. | Cu. ft. fly ash per yd. | 28-day compressive strength per sq. in. |
|---|---|---|---|
| 1.87 | 5.26 | 13.15 | 2460 |

SLAG AS COARSE AGGREGATE

Proportions, by volume, of concrete ingredients

| Cement | Fly ash | Sand | Slag |
|---|---|---|---|
| 1 | 1.25 | 1.5 | 2.5 |

| Water-cement ratio | Cu. ft. cement per yd. | Cu. ft. fly ash per yd. | 28-day compressive strength per sq. in. |
|---|---|---|---|
| 1.2 | 6.08 | 7.6 | 4220 |
| 1.33 | 5.88 | 7.35 | 3271 |

Proportions, by volume, of concrete ingredients

| Cement | Fly ash | Sand | Slag |
|---|---|---|---|
| 1 | 1.75 | 1 | 2.5 |

| Water-cement ratio | Cu. ft. cement per yd. | Cu. ft. fly ash per yd. | 28-day compressive strength per sq. in. |
|---|---|---|---|
| 1.47 | 5.92 | 10.36 | 3048 |

Proportions, by volume, of concrete ingredients

| Cement | Fly ash | Sand | Slag |
|---|---|---|---|
| 1 | 2 | 1 | 2.5 |

| Water-cement ratio | Cu. ft. cement per yd. | Cu. ft. fly ash per yd. | 28-day compressive strength per sq. in. |
|---|---|---|---|
| 1.6 | 5.63 | 11.26 | 2712 |

Proportions, by volume, of concrete ingredients

| Cement | Fly ash | Sand | Slag |
|---|---|---|---|
| 1 | 2.5 | .7 | 6.31 |

| Water-cement ratio | Cu. ft. cement per yd. | Cu. ft. fly ash per yd. | 28-day compressive strength per sq. in. |
|---|---|---|---|
| 1.6 | 4.0 | 10 | 2400 |

From the above examples it will be noted that the water-cement ratio was always greater than unity, ranging up to over two, and yet the compressive strength of the resultant concrete was never less than 2000 pounds per square inch. It will be noted that the fly ash is present in amounts ranging from an amount equal to the amount of the cement, by volume, upwardly to an amount over five times the amount of the cement, with many strong concretes using fly ash in amounts varying from 1½ to 2½ times the amount of the cement. It will also be noted that high strength results are obtained with cement contents varying from approximately 4 to approximately 9 cubic feet of cement per yard of concrete.

The cinders used in the above test were the product of stoker fire electric power generating boilers. They were run through a crushing machine which reduced the maximum size of the particles to about 1½ inches. Only 5% of these cinders passed a 200 mesh screen. It is thus evident that the cinders used were in no respect similar physically to the fly ash.

Although the mix proportions given above are quoted by volumes, the mixes were proportioned by surface dry rodded weights (see A. S. T. M. Designation C-29).

I am aware that others have previously suggested that fly ash might advantageously be used as an ingredient of concrete. It has been proposed as an admixture to the concrete, an admixture being defined as a material which is used in small quantities, usually less than 25% of the cement. One suggestion was to the effect that fly ash be used in mortars containing cement and sand. These earlier proposals, however, are all to the effect that the fly ash be added in relatively small amounts, not for the purpose of replacing the fine aggregate, but as an addition to mortar or concrete containing fine aggregate, and usually for the purpose of increasing the workability of the mixture as by lubricating the mass.

It may be said that those who have heretofore had the most experience in the use of fly ash in concretes have insisted that the amount of this material used be kept quite small.

My concrete containing fly ash in quantities much greater than the quantity of the cement is, therefore, a radical departure from any concretes heretofore suggested or actually used in practice. It is not only different in composition but is stronger, as compared with other concretes using equal cement contents, it is lighter in weight, it is more workable, it has greater elasticity. It is also more uniform in texture and appearance and requires less refinement in the grading of the coarse aggregate because of the increase in the ratio of the mortar or matrix material to the coarse aggregate. It also has a lowered temperature rise after having been poured in place.

This application is a continuation in part of my copending application, Serial 92,147, filed July 23, 1936.

Although I have described specific examples of my invention, it is to be understood that the scope thereof is limited only by the claims hereof.

Having thus described the invention, what is claimed as new and desired to be secured by Letters Patent is:

1. Concrete formed from an easily workable homogeneous plastic mass comprising cement and aggregate, said mass being characterized by the presence of fine aggregate which consists of fly ash and sand and by a quantity of water substantially greater than that used in similar concretes in which sand is the sole fine aggregate, the amount of fine aggregate, by volume, exceeding twice the amount of cement and the amount of fly ash in the fine aggregate being, by volume, from approximately 1½ to approximately 2½ times the amount of cement, and exceeding the amount of sand, the concrete being strong in compression, lighter in weight than similar concrete in which the fine aggregate is wholly sand, and of fine texture.

2. Concrete formed from an easily workable homogeneous plastic mass comprising cement and aggregate, said mass being characterized by the presence of fine aggregate which consists of fly ash and sand, the amount of fine aggregate, by volume, exceeding twice the amount of cement and the principal portion of the fine aggregate being fly ash, the concrete being at least as strong in compression but lighter in weight than similar concrete in which the fine aggregate is wholly sand, and fine in texture.

3. Concrete formed from an easily workable homogeneous plastic mass comprising cement and aggregate, the said mass being characterized by the presence of a fine aggregate which includes fly ash in an amount, by volume, which equals or exceeds the amount of cement, the total volume of fine aggregate being at least twice as great as the volume of cement, the concrete being high in compressive strength, relatively light in weight and fine in texture.

4. Concrete formed from an easily workable homogeneous plastic mass comprising cement and aggregate, the said mass being characterized by the presence of a fine aggregate which includes fly ash in an amount, by volume, which equals or exceeds the amount of cement, and by a quantity of water substantially greater than that used in similar concretes in which sand is the sole fine aggregate, the concrete being at least as high in compressive strength as, and being lighter in weight than, similar concrete in which sand is the fine aggregate.

5. A concrete mixture comprising cement, a coarse aggregate and fly ash, the volume of fly ash present being from 2 to 2½ times the volume of cement.

6. A concrete mixture consisting of cement, a coarse aggregate and fly ash, the volume of fly ash present being from 1½ to 2½ times the volume of cement.

7. A lightweight high-strength concrete comprising essentially cement, fly ash, and cinders in a ratio by volume of one part cement, two to two and one-half parts fly ash, and five to six parts cinders, having a compressive strength of over two thousand pounds per square inch and weighing under one hundred and five pounds per cubic foot.

8. A lightweight high-strength concrete comprising essentially cement, fly ash, and cinders in a ratio by volume of one part cement, two to two and one-half parts fly ash, and five to six parts cinders, having a compressive strength of over two thousand pounds per square inch and weighing under one hundred pounds per cubic foot.

9. A lightweight high-strength concrete mixture comprising cement, a coarse aggregate of cinders, and a fine aggregate of fly ash, the fly ash being present in a volume greater than the volume of cement present and having substantially the same specific gravity as the cinders whereby the fly ash particles mix thoroughly with the cinders without segregation, the fly ash particles being so small as to partially fill and plug cracks and voids in the cinders and thereby strengthen the cinder particles, the concrete when dry having a compressive strength of over 2000 pounds per square inch.

10. A concrete mixture comprising cement, a coarse aggregate and fly ash, the volume of fly ash present being greater than the amount of the cement.

11. The process of mixing a concrete mixture comprising cement, a coarse aggregate, and fly ash, the fly ash being present in amounts greater than the quantity of the cement, which includes the step of mixing the ingredients with water, the number of cubic feet of water used being greater than the number of cubic feet of cement, whereby to obtain a concrete having a compressive strength greater than 2000 pounds per square inch.

JOHN S. NELLES.